(12) United States Patent
Bernstein et al.

(10) Patent No.: US 9,641,253 B2
(45) Date of Patent: May 2, 2017

(54) DATA OVER CABLE SERVICE INTERFACE SPECIFICATION (DOCSIS) OVER PASSIVE OPTICAL NETWORK (PON)

(71) Applicant: Cisco Technology, Inc., San Jose, CA (US)

(72) Inventors: Alon Bernstein, San Jose, CA (US); John Chapman, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 254 days.

(21) Appl. No.: 14/453,725

(22) Filed: Aug. 7, 2014

(65) Prior Publication Data

US 2014/0348505 A1 Nov. 27, 2014

Related U.S. Application Data

(62) Division of application No. 11/971,820, filed on Jan. 9, 2008, now Pat. No. 8,831,425.

(51) Int. Cl.
*H04B 10/20* (2006.01)
*H04B 10/27* (2013.01)
*H04B 10/2575* (2013.01)
*H04L 12/28* (2006.01)

(52) U.S. Cl.
CPC ......... *H04B 10/27* (2013.01); *H04B 10/2575* (2013.01); *H04L 12/2801* (2013.01); *H04L 12/2885* (2013.01); *H04L 12/2898* (2013.01)

(58) Field of Classification Search
CPC . H04B 10/27; H04B 10/2575; H04L 12/2801; H04L 12/2885; H04L 12/2898

USPC .......................................................... 398/58
See application file for complete search history.

(56) References Cited

U.S. PATENT DOCUMENTS

| 6,058,421 | A | 5/2000 | Fijolek et al. |
|---|---|---|---|
| 7,502,841 | B2 * | 3/2009 | Small ................... H04L 12/14 709/223 |
| 8,036,530 | B2 | 10/2011 | Arnold et al. |
| 8,831,425 | B1 | 9/2014 | Bernstein et al. |
| 2003/0058885 | A1 | 3/2003 | Sorenson et al. |
| 2004/0070601 | A1 | 4/2004 | Staiger |
| 2004/0244043 | A1 | 12/2004 | Lind et al. |
| 2004/0264683 | A1 * | 12/2004 | Bye ..................... H04M 7/006 379/402 |
| 2007/0189770 | A1 | 8/2007 | Sucharczuk et al. |
| 2007/0276943 | A1 | 11/2007 | Marez et al. |

(Continued)

*Primary Examiner* — M. R. Sedighian
(74) *Attorney, Agent, or Firm* — Leon R. Turkevich

(57) ABSTRACT

A Data Over Cable Service Interface Specifications (DOCSIS) Passive Optical Network (PON) system (DPON) makes optical subscribers appear as cable subscribers. In one embodiment, a Cable Modem (CM) proxy is located in an Optical Line Termination (OLT). The OLT implements a cable modem protocol stack that operates as the CM proxy and communicates with a back office system. The OLT translates the data retrieved by the CM proxy into Optical Network Unit (ONU) recognizable commands, and sends the translated data to the ONU. In a second embodiment, the CM proxy is located in the ONU. The ONU implements the cable modem protocol stack that operates as the CM proxy and communicates with the back office system. The ONU translates the data retrieved by the CM proxy into ONU recognizable commands and sends the translated data to the ONU.

13 Claims, 8 Drawing Sheets

(56) References Cited

U.S. PATENT DOCUMENTS

2008/0120667 A1* 5/2008 Zaltsman .......... H04L 12/2856
725/110
2008/0138071 A1 6/2008 Lee et al.
2008/0310842 A1 12/2008 Skrobko

* cited by examiner

DATA OVER CABLE SERVICE INTERFACE SPECIFICATION (DOCSIS) OVER PASSIVE OPTICAL NETWORK (PON)

This application is a Divisional of U.S. patent application Ser. No. 11/971,820, filed Jan. 9, 2008.

TECHNICAL FIELD

The present disclosure relates generally to networking.

BACKGROUND

The Data Over Cable Service interface Specification (DOCSIS) environment has several strengths, including the ability to manage point to multi-point links and support service provider provisioning where subscribers can be added and removed at scale. The DOCSIS protocol has overcome the difficult tasks of managing upstream bandwidth while also effectively supporting Quality of Service (QoS) and providing many other subscriber applications. DOCSIS also provides a full security infrastructure where packets can be encrypted, incoming data checked, and Internet Protocol (IP) address verified. Thus, DOCSIS provides a cost effective, time tested and reliable technology.

Passive Optical Networks (PON) are rapidly evolving and may eventually replace traditional wireline access technologies such as Digital Subscriber Lines (DSLs). Unfortunately, PON protocols do not support the full functionality of DOCSIS.

INTRODUCTION

A Data Over Cable Service Interface Specifications (DOCSIS) Passive Optical Network (PON) system (DPON) makes optical subscribers appear as cable subscribers. In one embodiment, a Cable Modem (CM) proxy is located in an Optical Line Termination (OLT). The OLT implements a cable modem protocol stack that operates as the CM proxy and communicates with a back office system. The OLT translates the data retrieved by the CM proxy into Optical Network Unit (ONU) recognizable commands, and sends the translated data to the ONU. In a second embodiment, the CM proxy is located in the ONU. The ONU implements the cable modem protocol stack that operates as the CM proxy and communicates with the back office system. The ONU translates the data retrieved by the CM proxy into ONU recognizable commands and sends the translated data to the ONU.

DETAILED DESCRIPTION

Figure 1:
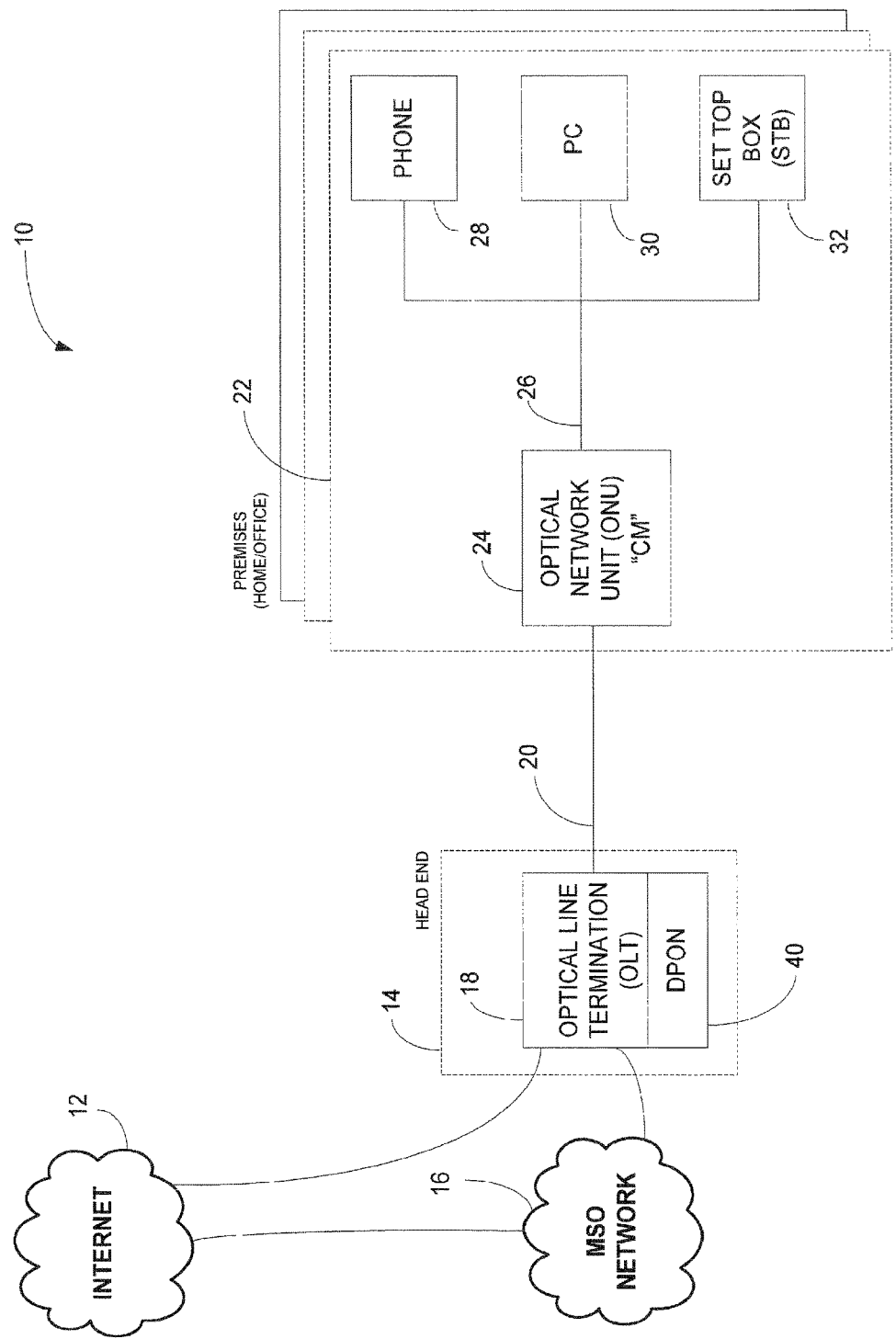
FIG. 1 is a schematic block diagram of a DOCSIS PON (DPON) network architecture.

FIG. 1 shows a Passive Optical Network (PON) 10 that includes an Optical Line Termination (OLT) unit 18 that communicates over an optical cable 20 with one or more Optical Network Units (ONUs) 24. There are several different types of PON networks, such as Ethernet PON (EPON), Gigabit PON (GPON), and Wavelength-Divisional Multiplexing (WDM-PON). The PON 10 is a point-to-multipoint, fiber to the premises network architecture in which unpowered optical splitters (not shown) are used to enable a single optical fiber 20 to serve multiple premises 22. The PON 10 reduces the amount of fiber and central office equipment typically used in point to point architectures.

The OLT 18 is typically located at a service provider central office head end 14. The OLT 18 receives Internet Packet (IP) data from a packet switched Wide Area IP network 12. The packet data received by OLT 18 is converted into downstream optical signals and broadcast to each premises 22 sharing optical fiber 20. Upstream signals are combined using a multiple access protocol such as Time Division Multiple Access (TDMA).

The ONUs 24 are typically located near end user locations generally referred to as customer premises or subscribers. Often the customer premises may be a home or an office. However, the customer premises 22 can be located anywhere video, voice or data services are needed. The ONUs 24 convert the optical signals carried over the PON cable 20 back into digital packet data. In one example, ONUs 24 convert the optical signals into digital Ethernet packets that are sent over an Ethernet cable 26 to different Customer Premise Equipment (CPE), such as a phone 28, Personal Computer (PC) 30, and/or television Set-Top Box (STB) 32.

A MSO network or "back office" 16 provides different network services. For example, servers in MSO network 16 may be used for assigning IP addresses, providing Time of Day (ToD) information, provisioning network resources, operating in a multi-media environment, and operating a Simple Network Management Protocol (SNMP). While the services provided by MSO network 16 are readily available in cable networks, many of these services are not supported in PON networks.

DPON

There is a need to integrate PON subscribers 22 into the MSO backoffice network 16 as if they were cable modems. However deploying a PON network 10 in an MSO network 16 is more than a protocol definition.

To enable compatibility between the MSO network 16 and the PON network 10, the OLT 18 is managed with a Data Over Cable Service Interface Specifications (DOCSIS) PON (DPON) system 40. The DPON system 40 operates Cable Modem Termination System (CMTS) subscriber management software that acts as a gateway between a Cable Modem Termination System (CMTS) and PON 10. The DPON system 40 includes a translator that converts DOCSIS parameters obtained from the MSO network 16 into PON parameters.

The DPON system 40 operates with different PON standards that handle the layer one (physical layer) connection establishment to the ONUs 24 while allowing the DOCSIS protocol to handle the second and third data link and network layers, respectively. This partitioning allows for a clean demarcation of where PON stops and DOCSIS begins.

Figure 2:
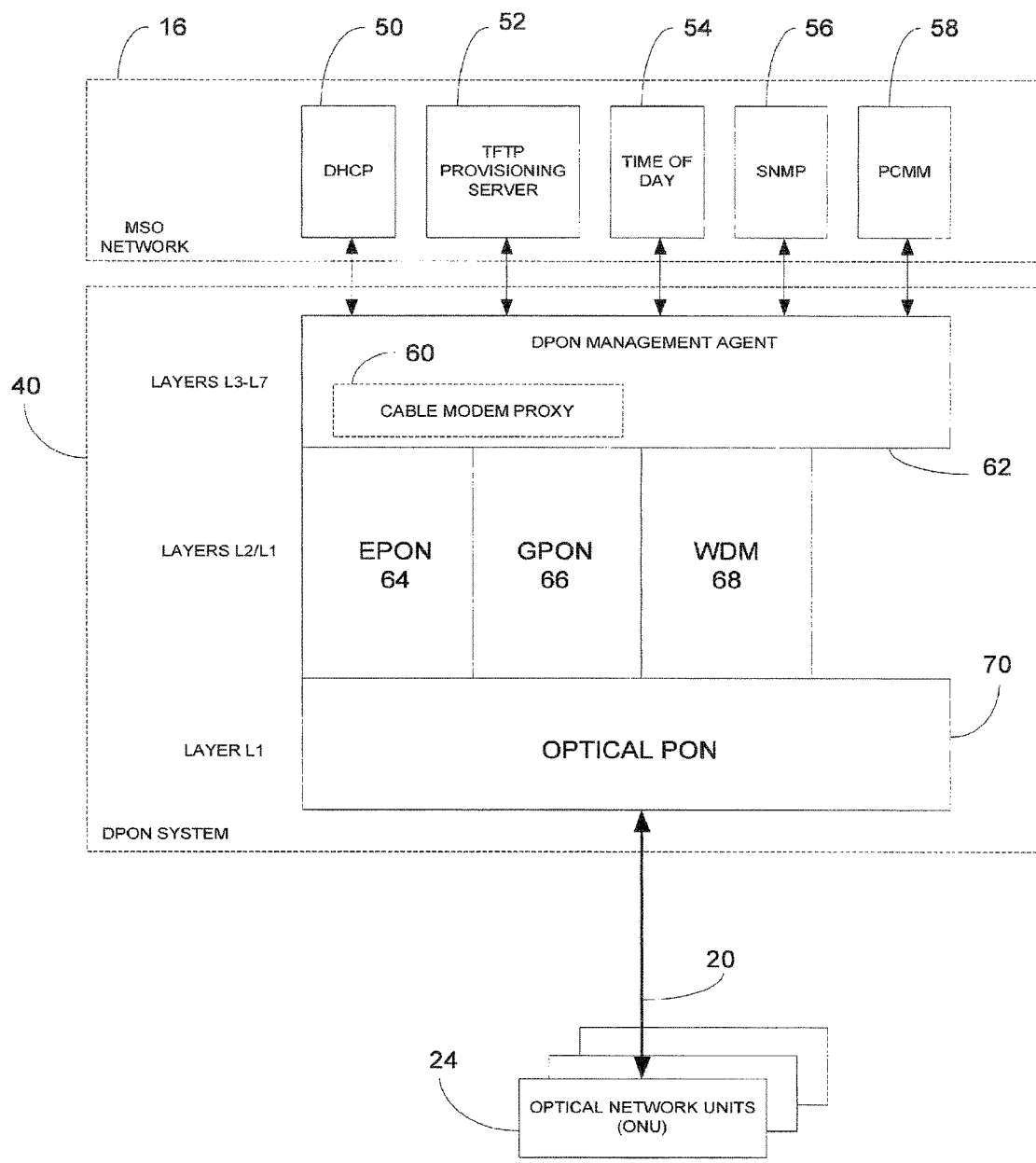
FIG. 2 is a block diagram showing the DPON system in FIG. 1 in more detail.

FIG. 2 shows the DPON system 40 in more detail. The blocks in FIG. 2 generally refer to different operations that are provided by software instructions that are executed on a programmable processor. However, it is also possible that some or all of these operations may be executed by hardware circuitry.

The DPON system 40 includes a DPON management agent 62 that operates at layers L3-L7 of the Open System Interconnect (OSI) model. Any combination of EPON drivers 64, GPON drivers 66, or WDM drivers 68 operate at layer 2/layer 1 of the OSI model between the DPON management agent 62 and a physical layer 1 optical PON controller 70.

The DPON management agent 62 operates a cable modem proxy 60 that conducts DOCSIS cable modem sessions on behalf of the ONUS 24. The cable modem proxy 60 conducts cable modem registration or post registration services with any one of multiple different servers 50-58 in the MSO network 16 that are conventionally only used for providing cable network provisioning services.

For example, the CM proxy 60 in management agent 62 may conduct a Dynamic Host Configuration Protocol (DHCP) session with a DHCP server 50 for discovering an Internet Protocol (IP) address on behalf of the ONU 24. The IP address is assigned to the ONU 24 and also used by the OLT 18 when communicating with the ONU 24.

The CM proxy 60 may also conduct a Trivial File Transfer Protocol (TFTP) session with a TFTP provisioning server 52 to obtain different DOCSIS service definitions. The service definitions are used for example to assign different Quality of Service (QoS) parameters to subscribers. The CM proxy 60 may also communicate with a Time of Day (ToD) server 54 to obtain time of day information on behalf of the ONU 24. The CM proxy 60 can also communicate with an SNMP server 56 when conducting network management operations and can communicate with a PacketCable Multi-Media (PCMM) server 58 to register for multi-media services. These are just examples of any cable services that can be performed by the CM proxy 60 on behalf of the ONU 24.

Figure 3:
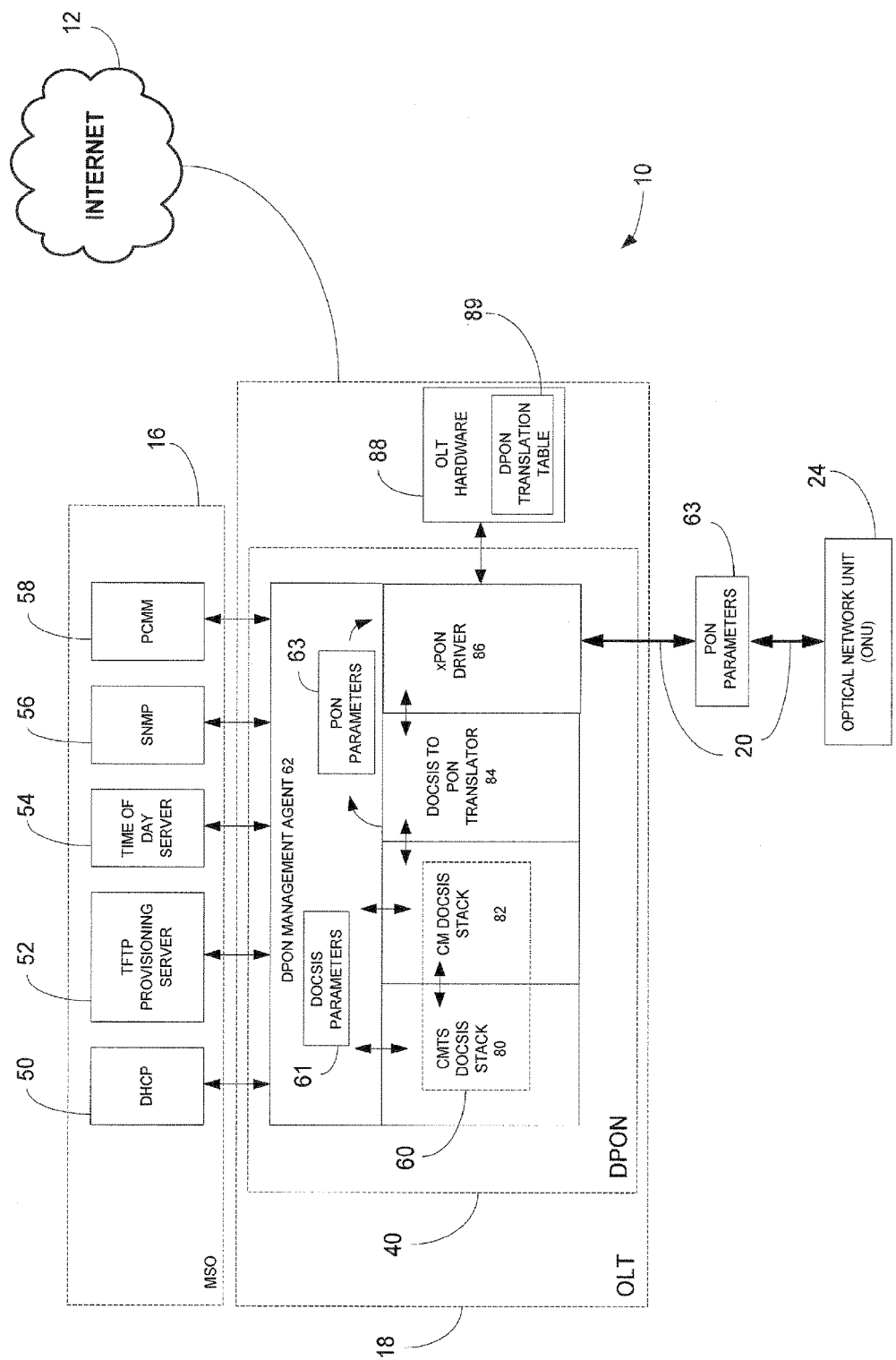
FIG. 3 is a block diagram showing in more detail a cable modem proxy used in the DPON system of FIG. 2.

A translation function shown in FIG. 3 then translates the information obtained by the cable modem proxy 60 during the registration or post registration sessions into corresponding PON parameters. The PON parameters are then sent to the associated ONUs 24 and/or used by EPON 64, GPON 66, or WDM 68 when communicating with the ONUs 24.

FIG. 3 shows the DPON system 40 in more detail. A Cable Modem Termination System (CMTS) stack 80 conducts some of the operations that would normally be performed by a CMTS in the head end of a DOCSIS cable network. A Cable Modem (CM) DOCSIS stack 82 conducts some of the operations that would normally be performed by a cable modem located at the customer premises of the DOCSIS cable network. However, in this configuration, the CMTS DOCSIS stack 80 and CM DOCSIS stack are located in the OLT 18 of the PON network 10.

The CMTS stack 80 and CM stack 82 together operate as the cable modem proxy 60 that together communicate with any of the MSO servers 50-58 described above. Operating both of these DOCSIS stacks 80 and 82 in the OLT 18 effectively allow any of the services normally supported in a cable network to also be used in PON 10.

A DOCSIS-to-PON translator 84 is then used for converting any of the parameters 61 obtained by the cable modem proxy 60 into associated PON parameters 63 that can be used by the OLT 18 and ONU 24. Some of the translated PON parameters 63 are programmed into a PON driver 86 for either communicating with the ONU 24 or sent over the optical cable 20 for configuring the ONU 24. The PON driver 86 represents any of the EPON 64, GPON 66, or WDM 68 previously shown in FIG. 2. The translated PON parameters 63 may also be used for operating or configuring OLT hardware 88.

Figure 4:
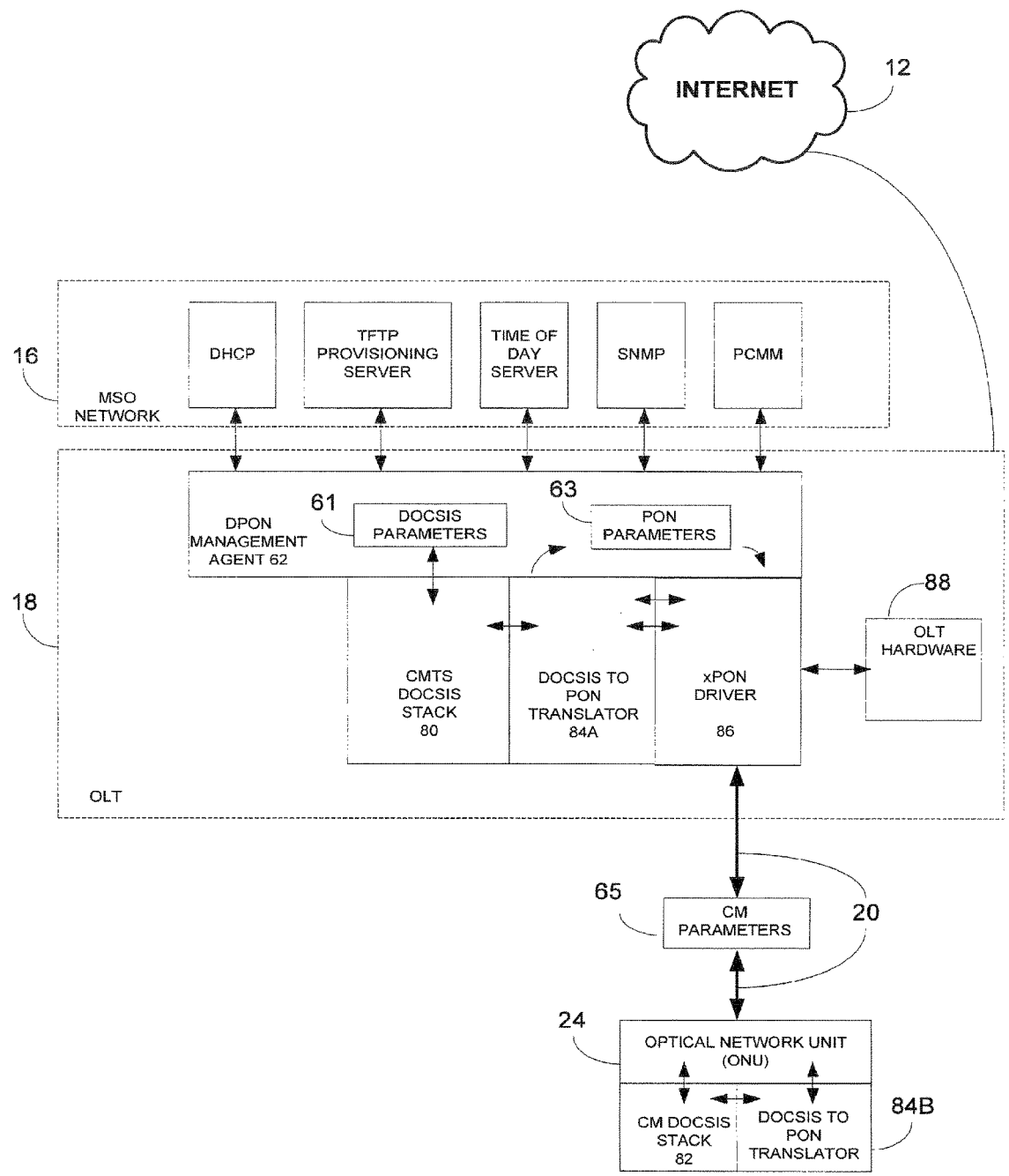
FIG. 4 shows an alternative embodiment where at least part of the cable modem proxy is located in an Optical Network Unit (ONU).

FIG. 4 shows an alternative embodiment where portions of the CM proxy 60 are located in both the OLT 18 and the ONU 24. For example, the CMTS DOCSIS stack 80 is located in the OLT 18 and the CM DOCSIS stack 82 is located in the ONU 24. The CMTS stack 80 and CM stack 82 communicate together through the DPON management agent 62 when registering for the different services in MSO network 16.

A first DOCSIS-to-PON translator 84A converts some of the DOCSIS parameters 61 obtained from the MSO registration sessions that are used by the OLT 18. For example, certain DOCSIS QoS and security information may be used by the OLT 18 for transmitting or denying service for certain types of packet data received over Internet 12. These OLT related DOCSIS parameters 61 are sent to translator 84A and converted into PON parameters 63 that are then programmed into the OLT 18. Accordingly, the OLT 18 operates according to these particular QoS and security parameters 63. This translation is also described in further detail below in FIG. 5.

Other DOCSIS parameters 61 obtained during sessions with MSO network 16 may be sent directly to the CM DOCSIS stack 82 in ONU 24. In this case, the cable modem DOCS IS parameters 65 are sent from the CMTS stack 80 either untranslated or translated to the PON driver 86. The PON driver 86 uses PON signaling over optical cable 20 to send the cable modem parameters 65 to the ONU 24. The CM DOCSIS stack 82 communicates messages back through the optical cable 20 and CMTS DOCSIS stack 80 to the MSO network 16.

For example, certain DOCSIS information 61 may be obtained via a handshaking protocol between the CM DOCSIS stack 82 and one or more of the servers in MSO network 16. These handshaking messages are relayed between the MSO network 16 and CM DOCSIS stack 82 over the DPON management agent 62 and CMTS DOCSIS stack 80. The CM messages 65 are converted between digital packet data and optical signals by the PON driver 86 and sent to the ONU 24 over optical cable 20.

The MSO registration session may complete with one or more DOCSIS parameters 61 being obtained by the CM DOCSIS stack 82. The DOSCIS parameters 61 are sent to a DOCSIS-to-PON translator 84B in ONU 24 for converting into corresponding ONU parameters. The converted ONU parameters are then programmed into the ONU 24 by translator 84B. As mentioned above, any of these handshaking operations can alternatively be performed by the CM DOCSIS stack 82 in FIG. 3 that is located in the OLT 18. In that case, the DOCSIS parameters 61 are all obtained and translated in the OLT 18 and then programmed into the ONU 24 remotely from the OLT 18.

Figure 5:
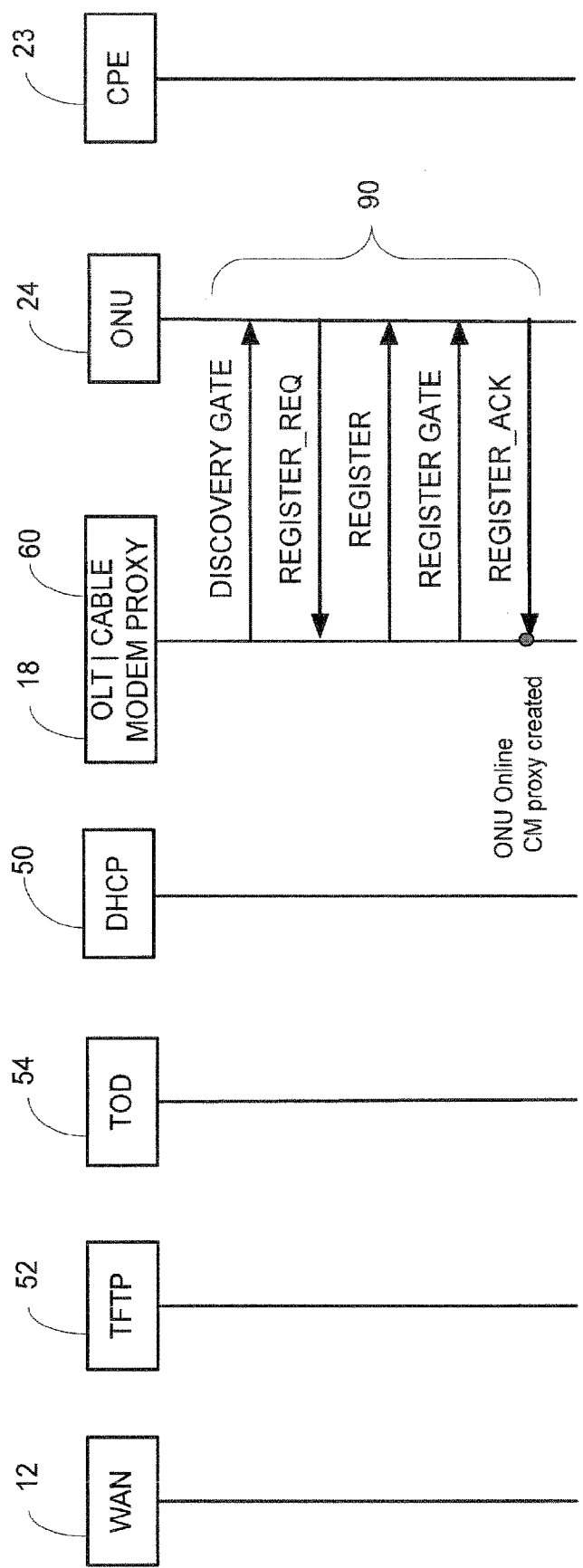
FIGS. 5-7 are message diagrams that show how the cable modem proxy conducts cable modem sessions on behalf of an ONU.

FIG. 5 explains how an EPON style registration first establishes physical layer connectivity between the OLT 18 and the ONU 24. This particular example involves EPON, however it should be understood that other optical networks could be used, such as GPON, WDM, and other Fiber To the Home technologies. Customer Premise Equipment (CPE) 23 can include any of the phone 28, PC 30, and/or STB 32 previously shown in FIG. 1 or could include any other electronic devices. The DHCP server 50, ToD server 54, and TFTP server 52 are standard and used in any conventional MSO network 16.

The OLT 18 runs CMTS software 80, and possibly the cable modem software 82 previously described in FIG. 3. Therefore, the OLT 18 appears as a CMTS to the MSO servers 50-54 that manage subscribers. The EPON 64 in FIG. 2 handles the physical layer connection signaling 90 and replaces the DOCSIS process of initial ranging and station maintenance. The EPON physical layer signaling 90 includes the OLT 18 sending out a discovery gate message that is then responded to by the ONU 24 with a register request message. The OLT 18 replies back to the ONU 24 with register and register gate messages. In response the ONU 24 sends a registration acknowledge message back to the OLT 18. After the register acknowledge message is sent back to the OLT 18, the ONU 24 and OLT 18 are connected and the CM proxy 60 in FIG. 3 is activated.

Figure 6:
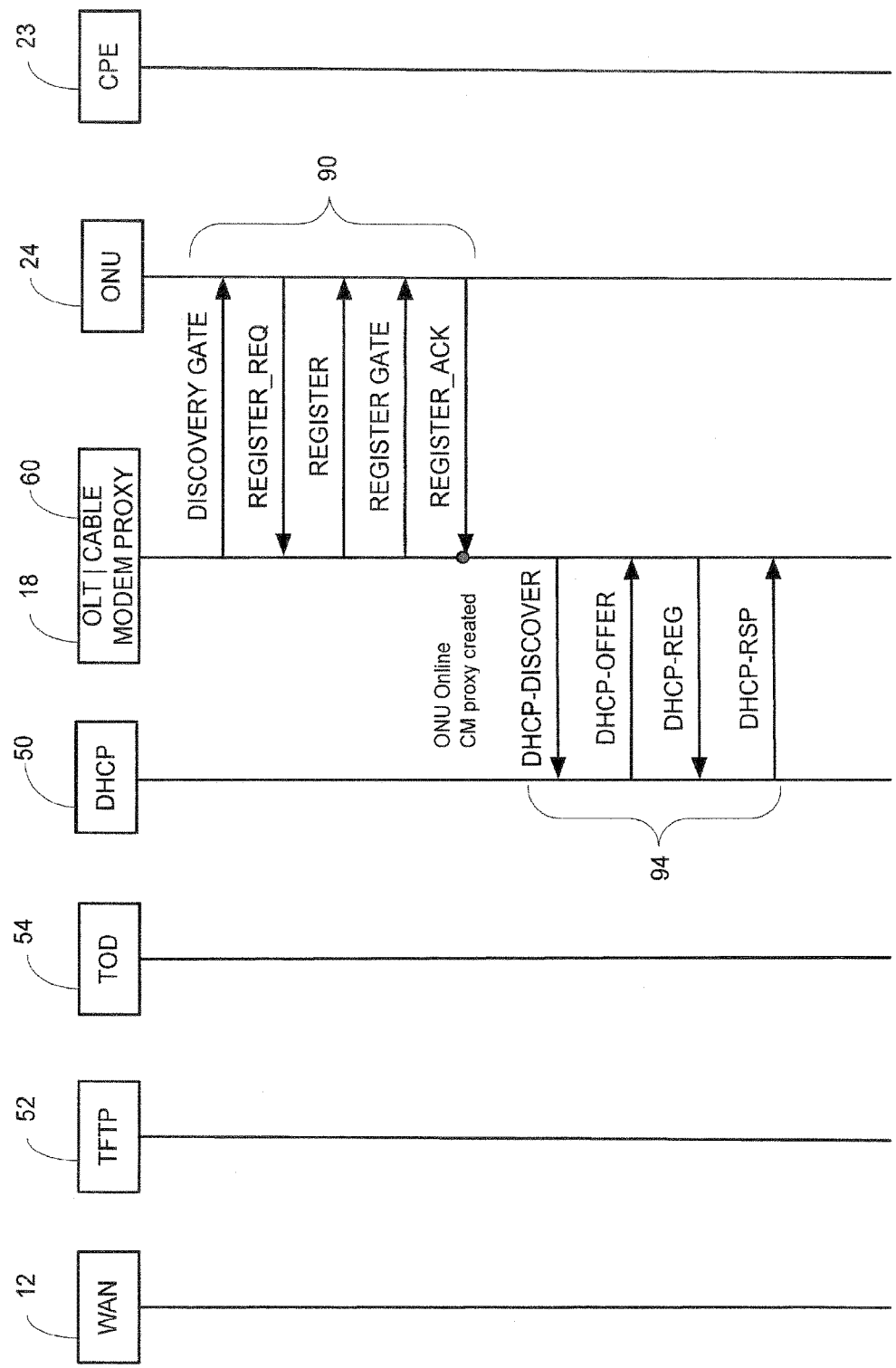

FIG. 6 shows a second CM proxy registration phase 94 where an IP address is assigned to the cable modem proxy 60 on behalf of the ON U 24. A DHCP discover message is first sent by the cable modem proxy 60 to the DHCP server 50. The DHCP server 50 sends back a DHCP offer message and the CM proxy 60 responds with a DHCP registration message. The DHCP response sent back by the DHCP server 50 then confirms the IP address assigned to the CM proxy 60.

In cable networks, this IP address is used for the management of a cable modem. In the PON network 10 there are different options. In one embodiment, the IP address obtained by the CM proxy 60 is sent to the ONU 24 though an Operations, Administration, and Maintenance (OAM) channel. The SNMP server 56 in FIG. 3 can then communicate directly with the ONU 24. In another embodiment, the EP address stays at the OLT 18. The OLT 18 then sends OAM messages with SNMP queries embedded in them to the ONU 24 and the CM proxy 60 holds the IP address as a proxy for the ONU 24.

Figure 7:
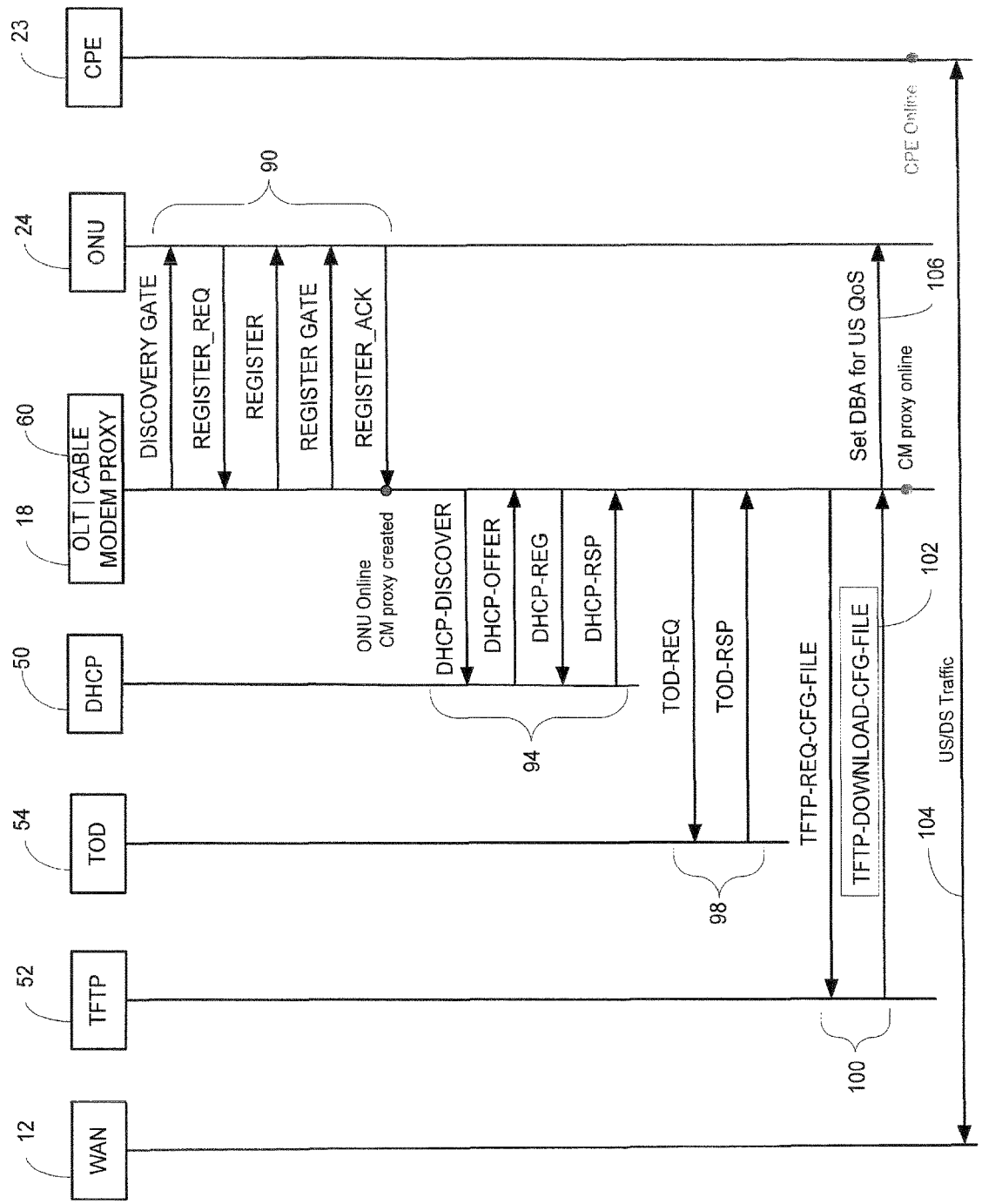

Referring to FIG. 7, after physical layer establishment 90 and address registration 94, other services may be configured by the CM proxy 60 on behalf of the ONU 24. For example, a time of day session 98 can be conducted between the CM proxy 60 and the ToD server 54 to acquire a time parameter. The CM proxy 60 sends a TOD request to the TOD server 54 and receives back a time value in the TOD response. The time information is then used by either the OLT 18 and/or sent to the ONU 24.

In another TFTP session 100, the CM proxy 60 may send a TFTP request for a DOCSIS configuration file download. The TFTP server 52 replies with a TFTP download configuration file 102. The information in the TFTP file 102 is then translated and used for configuring schedulers/classifiers or other features on the OLT 18 and ONU 24. For example, the information in TFTP configuration file 102 may be used to configure Dynamic Bandwidth Allocation (DBA) 106 for Upstream (US) Quality of Service (QoS) between the OLT 18 and ONU 24.

After the registration process is completed, communication links 104 are established between the OLT 18 and the ONU 24 that operate according to the DOCSIS parameters obtained by the CM proxy 60 during sessions 94, 98, and 100. Both the upstream communications and downstream communications in the optical links may operate according to these DOCSIS parameters. Any CPE 23 may then communicate similarly to any CPE operating behind a cable modem.

Note that there is no need for DOCSIS REG-REQ/RSP/ACK messages as the ONU 24 gets programmed through the OAM channel. While there may be no need to send. DOCSIS DSx messages to the ONU 24, the basic concept of a "dynamic service" can be adopted by EPON/GPON and queuing/classification rules. These rules can be dynamically created as a result of PC/PCMM (PacketCable™/Packet-Cable Multi-Media) gates from the PC/PCMM server 58 and relayed to the ONU 24 through the Operation and Maintenance Channel (OAM) channel.

Figure 8:
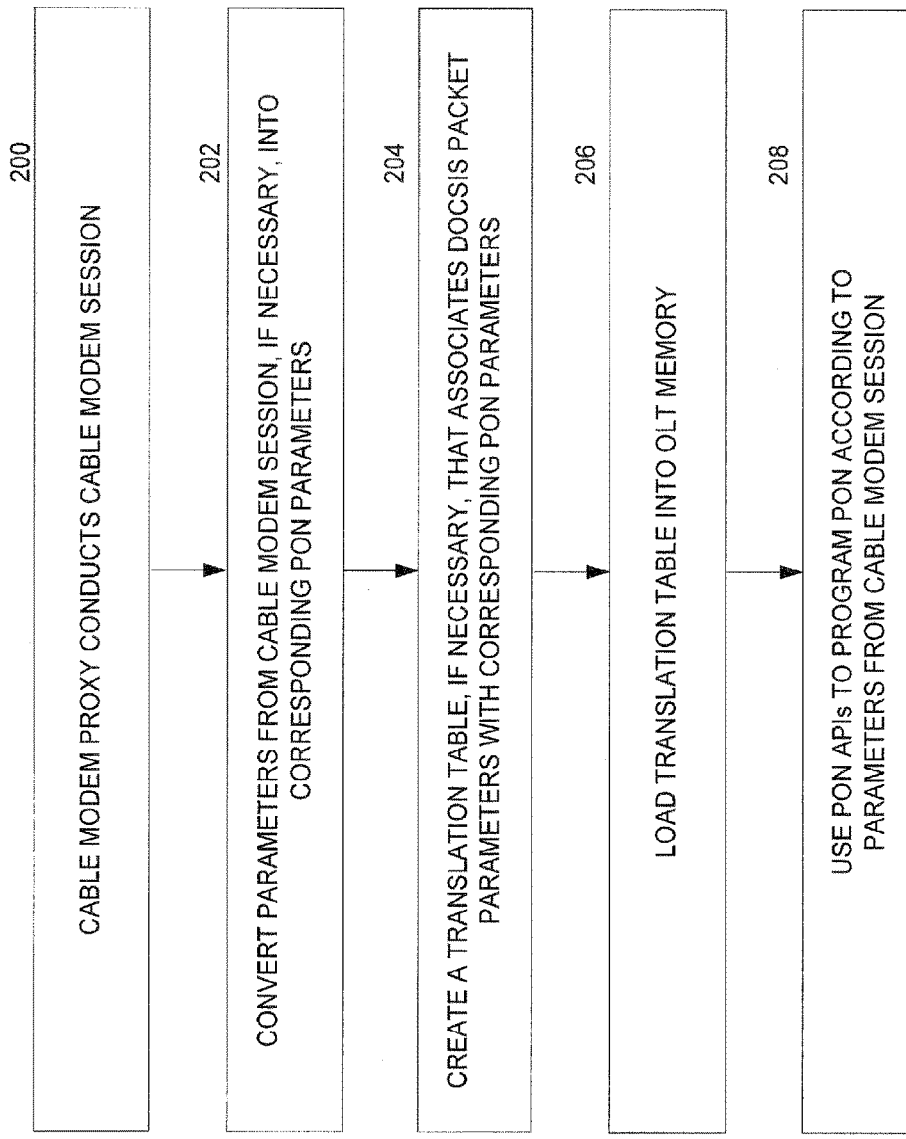
FIG. 8 is a flow diagram showing how a translator converts DOCSIS parameters into PON parameters.

FIG. 8 explains in more detail one example of how the CM proxy 60 and DOCSIS-to-PON translator 84 in FIG. 3 may operate when translating QoS parameters 61. The EPON follows an Ethernet model for QoS where, instead of individual service flows, there are priorities within a pipe. This is also a model common in the DSL world where the "pipe" is the rate that the DSL modem is capable of reaching. In the EPON case the "pipe" is defined on the upstream by a Logical Link Identifier (LLID). Since a queue depth for each priority is signaled in every report message, it is possible to enhance an EPON scheduler to perform per-queue rate limiting. Alternatively, current DOCSIS flow definitions could be used with the understanding that all the individual service flows are shaped to a given pipe rate, and not to the whole downstream/upstream bandwidth.

Referring both to FIGS. 3 and 8, in operation 200, the CM proxy 60 participates in a TFTP session 100 as described above in FIG. 7. The CM proxy 60 obtains a TFTP configuration file 102 (FIG. 7) from the TFTP server 52 that contains DOCSIS parameters 61. For example, the TFIP file 102 may contain a request for a video service at 10 million bits per second (Mbps), a voice service of 100 thousand bps (Kbps), and data service of 50 million bits per second (Mbps). The CM proxy 60 forwards these QoS parameters 61 from the TFTP file 102 to the DOCSIS-to-PON translator 84.

As mentioned above, the PON network may not support individual service flows but alternatively may only support a single bit rate for each "pipe" to an ONU 24. In this case, the translator 84 in operation 202 may convert all of the different DOCSIS service flow rates into a single PON bit rate parameter 63. For example, the translator 84 may sum up all of the different hit rates for the individual DOCSIS services flows associated with a particular ONU 24. In this example, the total summed bit rate for the ONU 24 may be 60.1 Mbps. The translator 84 may then assign different priorities for each of the different types of voice, video and data identified in the TFTP file 102 (FIG. 7). For example, voice data flows may be assigned a highest priority, video flows may be assigned a second highest priority, and data flows may be assigned a low priority.

The translator 84 may also create a DPON translation table 89 (FIG. 3) in operation 204 that the OLT 18 uses for handling packets directed to the ONU 24. For example, the DPON translation table 89 created by translator 84 can associate different source addresses with different services flows. If the packets have a destination address associated with the ONU 24, then the OLT 18 assigns priorities to the packets according to the priority values 63 in DPON translation table 89.

The DPON translation table 89 is loaded into OLT memory in operation 206. The translator 84 in operation 208 uses PON Application Programmers Interfaces (APIs) to program the OLT 18 according to the different translated PON parameters 63. In this example, the translator 84 programs the OLT 18 to provide the pipe to ONU 24 at a bit rate of 60.1 Mbps and programs the OLT 18 to use the DPON translation table 89 when assigning priority to packets directed to ONU 24.

The OLT 18 checks the destination address for received packets. If the packets have an IP source address associated with the ONU 24, the OLT 18 processes the packets according to DPON translation table 89. For example, if the packets have a source address associated with voice data, then the OLT 18 assigns the packets a high priority when the voice packets are transferred upstream or downstream with the ONU 24. Thus, the CM proxy 60 in combination with the DOCSIS-to-PON translator 84 (FIG. 3) can be used to support DOCSIS service flows in a PON network.

The system described above can use dedicated processor systems, micro controllers, programmable logic devices, or microprocessors that perform some or all of the operations. Some of the operations described above can be implemented in software and other operations can be implemented in hardware.

For the sake of convenience, the operations are described as various interconnected functional blocks or distinct software modules. This is not necessary, however, and there can be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention can be modified in arrangement and detail without departing from such principles. Claim is made to all modifications and variation coming within the spirit and scope of the following claims.

The invention claimed is:

1. A method, comprising:
operating a cable modem proxy that conducts a Data Over Cable Service Interface Specifications (DOCSIS) cable modem session on behalf of an optical network device implemented as an Optical Network Unit (ONU), including operating a Cable Modem Termination System (CMTS) Data Over Cable Service Interface Specifications (DOCSIS) stack in an Optical Line Termination (OLT) unit, and causing a cable modem DOCSIS stack to operate either in the OLT or in the ONU;
obtaining cable modem operating parameters from the DOCSIS cable modem session;
converting the cable modem operating parameters into optical network operating parameters;
using the optical network operating parameters for communicating with the optical network device or operating the optical network device; and
using the CMTS DOCSIS stack and the cable modem DOCSIS stack for conducting the cable modem session on behalf of the ONU.

2. The method according to claim 1 further comprising:
conducting a Passive Optical Network (PON) discovery session with an Optical Network Unit (ONU); and
conducting the DOCSIS cable modem session from the same location used for conducting the PON discovery session.

3. The method according to claim 1, further comprising:
creating a translation table that associates the cable modem operating parameters with the optical network operating parameters; and
using the translation table for forwarding packets to an Optical Network Unit (ONU).

4. The method according to claim 1 further comprising:
conducting a DOCSIS Trivial File Transfer Protocol (TFTP) session with a TFTP server;
receiving a TFTP configuration file from the TFTP server during the TFTP session that contains DOCSIS service definitions;
converting the DOCSIS service definitions into optical network definitions; and
operating the optical network device according to the optical network definitions.

5. A non-transitory computer readable medium having instructions stored thereon that, when executed by a computing platform, are adapted to:
communicate with a Multiple System Operator (MSO) network;
conduct a cable modem session for cable mode registration and/or cable modem services over the MSO network;
obtain cable modem parameters from the cable modem session;
translate the cable modem parameters into Passive Optical Network (PON) operating parameters;
program one or more optical network devices in the PON according to the PON operating parameters translated from the cable modem parameters;
operate a Cable Modem Termination System (CMTS) Data Over Cable Service Interface Specifications (DOCSIS) stack in an Optical Line Termination (OLT) unit;
operate a cable modem DOCSIS stack either in the OLT or in an Optical Network Unit (ONU); and
use the CMTS DOCSIS stack and the cable modem DOCSIS stack for conducting the cable modem session on behalf of the ONU.

6. The computer readable medium according to claim 5 wherein all of the instructions are stored and executed on an Optical Line Termination (OLT) device or on an Optical Network Unit (ONU).

7. The computer readable medium according to claim 5 wherein the instructions when executed are further configured to program a PON driver in one of a Gigiabit Passive Optical Network (GPON), Ethernet Passive Optical Network (EPON), or Wavelength-Division Multiplexing (WDM) network to operate according to the cable modem parameters.

8. The computer readable medium according to claim 5 wherein the instructions when executed are further configured to:
send a Data Over Cable Service Interface Specifications (DOCSIS) Trivial File Transfer Protocol (TFTP) request to a TFTP server and receive back a TFTP file that contains DOCSIS service definitions, and
translate the received DOCSIS service definitions into PON service definitions.

9. The computer readable medium according to claim 5 wherein the instructions when executed are further adapted to:
convert parameters from the cable modem session into corresponding PON parameters;
create a translation table that associates the cable modem parameters with the PON operating parameters; and
use the translation table when transferring packets between an Optical Line Termination (OLT) unit and an Optical Network Unit (ONU).

10. An apparatus comprising:
one or more processors configured to:
operate a cable modem proxy that conducts a Data Over Cable Service Interface Specifications (DOCSIS) cable modem session on behalf of an optical network device implemented as an Optical Network Unit (ONU), including operating a Cable Modem Termination System (CMTS) Data Over Cable Service Interface Specifications (DOCSIS) stack in an Optical Line Termination (OLT) unit, and causing a cable modem DOCSIS stack to operate either in the OLT or in the ONU;

obtain cable modem operating parameters from the DOCSIS cable modem session;

convert the cable modem operating parameters into optical network operating parameters;

use the optical network operating parameters for communicating with the optical network device or operating the optical network device; and use the CMTS DOCSIS stack and the cable modem DOCSIS stack for conducting the cable modem session on behalf of the ONU.

11. The apparatus according to claim 10, wherein the one or more processors are configured to:

conduct a Passive Optical Network (PON) discovery session with an Optical Network Unit (ONU); and conduct the DOCSIS cable modem session from the same location used for conducting the PON discovery session.

12. The apparatus according to claim 10, wherein the one or more processors are configured to:

create a translation table that associates the cable modem operating parameters with the optical network operating parameters; and use the translation table for forwarding packets to an Optical Network Unit (ONU).

13. The apparatus according to claim 10, wherein the one or more processors are configured to:

conduct a DOCSIS Trivial File Transfer Protocol (TFTP) session with a TFTP server;

receive a TFTP configuration file from the TFTP server during the TFTP session that contains DOCSIS service definitions;

convert the DOCSIS service definitions into optical network definitions; and operate the optical network device according to the optical network definitions.

* * * * *